US008767055B2

(12) United States Patent (10) Patent No.: US 8,767,055 B2
Chen et al. (45) Date of Patent: Jul. 1, 2014

(54) IMAGE DISPLAY METHOD OF STEREO DISPLAY APPARATUS

(75) Inventors: Yu-Chieh Chen, Taipei County (TW); Chao-Yuan Chen, Hsinchu County (TW); Ching-Ming Wei, Taichung (TW)

(73) Assignee: Au Optronics Corporation, Hsinchu (TW)

( * ) Notice: Subject to any disclaimer, the term of this patent is extended or adjusted under 35 U.S.C. 154(b) by 289 days.

(21) Appl. No.: 13/244,663

(22) Filed: Sep. 25, 2011

(65) Prior Publication Data

US 2012/0105442 A1 May 3, 2012

(30) Foreign Application Priority Data

Oct. 29, 2010 (TW) ................................ 99137276 A (51) Int. Cl.
*H04N 13/04* (2006.01)
(52) U.S. Cl.
CPC ....... *H04N 13/0497* (2013.01); *H04N 13/0404* (2013.01)
USPC ........................................................ 348/54
(58) Field of Classification Search
CPC ...................................................... G06T 15/00
USPC .......................................................... 348/54
See application file for complete search history.

(56) References Cited

U.S. PATENT DOCUMENTS

| 4,829,365 | A | 5/1989 | Eichenlaub | |
|---|---|---|---|---|
| 8,331,023 | B2 * | 12/2012 | Wu et al. | 359/464 |
| 8,339,444 | B2 * | 12/2012 | Schultz et al. | 348/54 |
| 8,345,088 | B2 * | 1/2013 | Harrold et al. | 348/51 |
| 8,363,094 | B2 * | 1/2013 | Kim et al. | 348/56 |
| 8,368,744 | B2 * | 2/2013 | Yamada | 348/54 |
| 8,416,285 | B2 * | 4/2013 | Sakata et al. | 348/51 |
| 8,416,287 | B2 * | 4/2013 | Hiroya et al. | 348/54 |
| 8,427,746 | B2 * | 4/2013 | Si | 359/462 |

(Continued)

FOREIGN PATENT DOCUMENTS

| CN | 101836459 | 9/2010 |
|---|---|---|
| CN | 101840072 | 9/2010 |

(Continued)

OTHER PUBLICATIONS

"First Office Action of China Counterpart Application", issued on Oct. 18, 2011, p. 1-p. 4, in which the listed reference was cited.
"Office Action of Taiwan Counterpart Application", issued on Mar. 31, 2014, p. 1-p. 6.

*Primary Examiner* — Y Lee
*Assistant Examiner* — Irfan Habib
(74) *Attorney, Agent, or Firm* — Jianq Chyun IP Office (57) ABSTRACT

An image display method of a stereo display apparatus is provided. The image display method includes the following steps. A stereo display apparatus is provided, wherein the stereo display apparatus provides N view zones for a viewer and includes a periodic structure and a pixel plane. N view zones are divided in a space according to the N value. Projection areas corresponding to each of the view zones are formed on the pixel plane by the periodic structure, wherein each of the projection areas corresponds to at least one sub-pixel unit on the pixel plane. Image information of each view zone is obtained according to the corresponding sub-pixel units. A stereo image is displayed by blending image information of each view zone.

12 Claims, 9 Drawing Sheets

(56) References Cited

U.S. PATENT DOCUMENTS

| | | | |
|---|---|---|---|
| 8,482,604 B2* | 7/2013 | Tomita | 348/54 |
| 8,508,526 B2* | 8/2013 | Liou et al. | 345/213 |
| 8,514,275 B2* | 8/2013 | Jian | 348/54 |
| 8,520,062 B2* | 8/2013 | Kim et al. | 348/51 |
| 2002/0191073 A1* | 12/2002 | Satoh | 348/51 |
| 2006/0170764 A1 | 8/2006 | Hentschke | |
| 2009/0040401 A1* | 2/2009 | Tamura et al. | 349/15 |
| 2010/0033558 A1* | 2/2010 | Horie et al. | 348/58 |
| 2010/0073467 A1* | 3/2010 | Nam et al. | 348/59 |
| 2010/0309296 A1 | 12/2010 | Harrold et al. | |
| 2012/0105409 A1* | 5/2012 | Tsai | 345/211 |

FOREIGN PATENT DOCUMENTS

| | | |
|---|---|---|
| JP | 2006-262191 | 9/2006 |
| TW | 586630 | 5/2004 |
| TW | I296722 | 5/2008 |

* cited by examiner

IMAGE DISPLAY METHOD OF STEREO DISPLAY APPARATUS

CROSS-REFERENCE TO RELATED APPLICATION

This application claims the priority benefit of Taiwan application serial no. 99137276, filed on Oct. 29, 2010. The entirety of the above-mentioned patent application is hereby incorporated by reference herein and made a part of this specification.

BACKGROUND

1. Technical Field

The disclosure relates to an image display method, and more particularly, to an image display method for a stereo display apparatus.

2. Description of Related Art

As technology advances and develops, people's eagerness for better material life and spiritual life are increasing without a pause. When it comes to the spiritual life, in the world of technology, most people have the desire to realize their imagination and to experience it vividly with the help of stereo display apparatuses. For this reason, how to develop stereo display apparatuses suitable for displaying three-dimensional images has become the goal for manufacturers in the field.

Referring to current display technology, the technology of a three-dimensional display may be roughly categorized into two types. One is a stereoscopic type which requires a viewer to wear specially designed glasses and the other is an auto-stereoscopic type which allows the viewer to see directly with naked eyes. The development of the stereoscopic display technology is already matured, and is widely used for specific purposes such as military simulations or large-scale entertainment. However, since the level of convenience and comfort ability of the stereoscopic display technology is low, the technology is not popular. Thus, the auto-stereoscopic technology is gradually developing and becoming the new trend.

The auto-stereoscopic technology is currently developing a multi-view three-dimensional display technology. The multi-view three-dimensional display technology is advantageous because it can provide the viewer with larger view space or view freedom.

SUMMARY OF DISCLOSURE

The disclosure provides an image display method of a stereo display apparatus where the viewer can adjust the view distance while maintaining good display quality. The provided image display method also increases the error tolerance of the alignment precision between an optical device and a display apparatus.

The invention provides an image display method of a stereo display apparatus. The image display method includes the following steps. A stereo display apparatus is provided, wherein the stereo display apparatus provides N view zones (multi-view) for a viewer. The stereo display apparatus includes at least one periodic structure and at least one pixel plane. N view zones are divided in a space according to an N value. Projection areas corresponding to each of the view zones are formed on the pixel plane by the periodic structure. Each of the projection areas corresponds to at least one sub-pixel unit on the pixel plane. Image information of each view zone is obtained according to the corresponding sub-pixel units. A stereo image is displayed by blending the image information of each view zone.

In an embodiment, each of the view zones is a one dimensional spatial line segment or a two dimensional spatial plane.

In an embodiment, a period number of the periodic structure is T. In the step of forming each projection area on the pixel plane, each view zone is formed into T projection areas on the pixel plane.

In an embodiment, the image display method further comprises the following steps. Each sub-pixel unit is compared to determine whether each of the sub-pixel units corresponds to two or more view zones.

In an embodiment, if each of the sub-pixel units does not correspond to two or more view zones, in the step of obtaining image information of each view zone, the image information of each of the sub-pixel units is regarded as the image information of the corresponding view zone.

In an embodiment, if each of the sub-pixel units corresponds to two or more view zones, in the step of obtaining image information of each view zone, the image information of each of the sub-pixel units uses a superposing method as a function of a projection capacity of the projection area corresponding to each view zone, so as to obtain the image information of each view zone.

In an embodiment, the image display method further comprises the following steps. A plurality of reference points are defined on the periodic structure. Location information of the projection area corresponding to each view zone on the pixel plane is obtained according to each view zone and the corresponding reference points. The sub-pixel unit corresponding to each view zone is determined according to the location information of each projection area.

In an embodiment, the reference points are arranged in an array type along a first direction and a second direction. Defining the plurality of reference points comprises the following steps. A distance between the reference points on the first direction is adjusted according to a distance between the stereo display apparatus and a viewer. An angle between the first direction and the second direction is adjusted according to a distance between the stereo display apparatus and the viewer.

In an embodiment, the periodic structure comprises a lenticular lens, a liquid crystal lens, a barrier or a prism.

In an embodiment, the sub-pixel units comprise red sub-pixel units, green sub-pixel units, and blue sub-pixel units.

The present invention also provides a stereo display apparatus characterized in that a display content of the stereo display apparatus is adjusted according to a distance between a viewer and the stereo display apparatus.

Based on the above, in the embodiment, the image display method of the stereo display apparatus can adjust display content directed to different view distances, so as to increase the utilization convenience and the error tolerance of the alignment precision between an optical device and a display apparatus.

In order to make the aforementioned and other features and advantages more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Firstly, for a conventional auto-stereoscopic apparatus, a distance between the viewer and the conventional auto-stereoscopic apparatus must be determined from the start, so as to maintain the display quality seen by the viewer. This limitation causes a large inconvenience for the viewer. Furthermore, the alignment between an optical device and a display apparatus of the conventional auto-stereoscopic apparatus is very strict, which makes the fabrication process a challenge.

Accordingly, in the embodiment, the image display method of the stereo display apparatus can adjust display content directed to different view distances. The adjustment includes a horizontal direction and a vertical direction, so the view distance is no longer limited to a specific distance, and the utilization convenience of the stereo display apparatus may further be increased. In addition, since the display content can be adjusted, the error tolerance of the alignment precision between an optical device and a display apparatus is greater, and thus lowering the difficulty in fabrication and the production cost.

Figure 1:
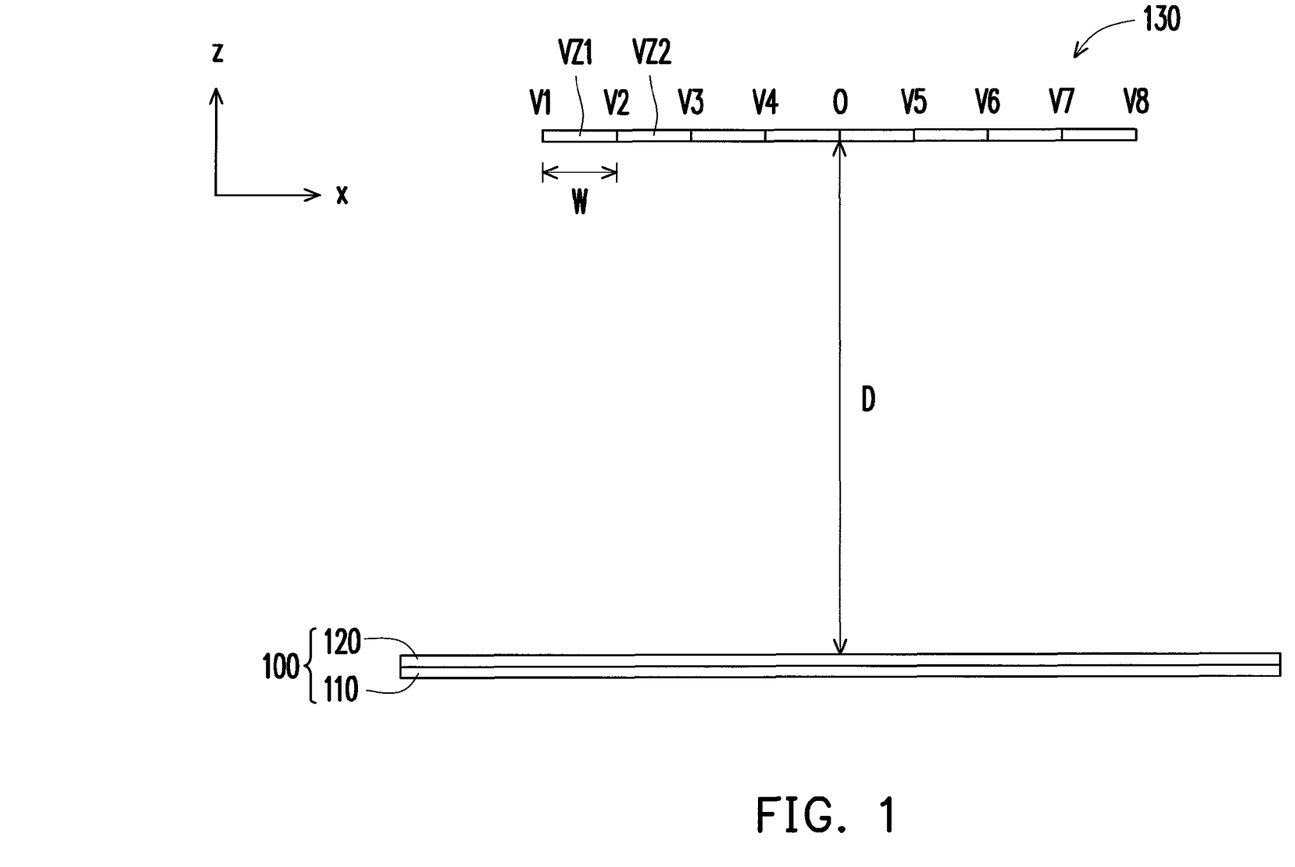
FIG. 1 is a schematic view illustrating a stereo display apparatus according to an embodiment.

FIG. 1 is a schematic view illustrating a stereo display apparatus according to an embodiment. Referring to FIG. 1, in the embodiment, the stereo display apparatus 100 includes a liquid crystal display panel 110 and an optical device 120, wherein the liquid crystal display panel 110 includes a pixel plane (i.e. pixel array), and the optical device 120 is, for example, a periodic structure.

In the embodiment, the stereo display apparatus 100 is, for example, a multi-view stereo display apparatus, which can provide N view zones for a viewer. For the multi-view stereo display apparatus 100, the image information of the N value representing N pictures is the source of the stereo image content.

The embodiment divides N view zones 130 with a width W in a space according to the N value. The N value is, for example, 8, as shown in FIG. 1. However, the view zone value of the embodiment can also be different from the value of 8, and 8 view zones represent 8 pictures of the same object at 8 different angles, so as to blend the stereo image of the object.

In the embodiment, the view zones are located on a surface parallel to the stereo display apparatus 100, but the invention is not limited thereto. The form of the view zones, such as width, location, arrangement type, and the distance between the stereo display apparatus are described only as an example, wherein the arrangement type only needs to be continuous, and is not limited to a straight line or an arc. Each of the view zones is a one dimensional spatial line segment or a two dimensional spatial plane, and herein a one dimensional spatial line segment is taken as each view zone for example. It should be noted that a distance D between the view zones and the stereo display apparatus can represent a distance between a viewer and the stereo display apparatus 100.

Figure 2:
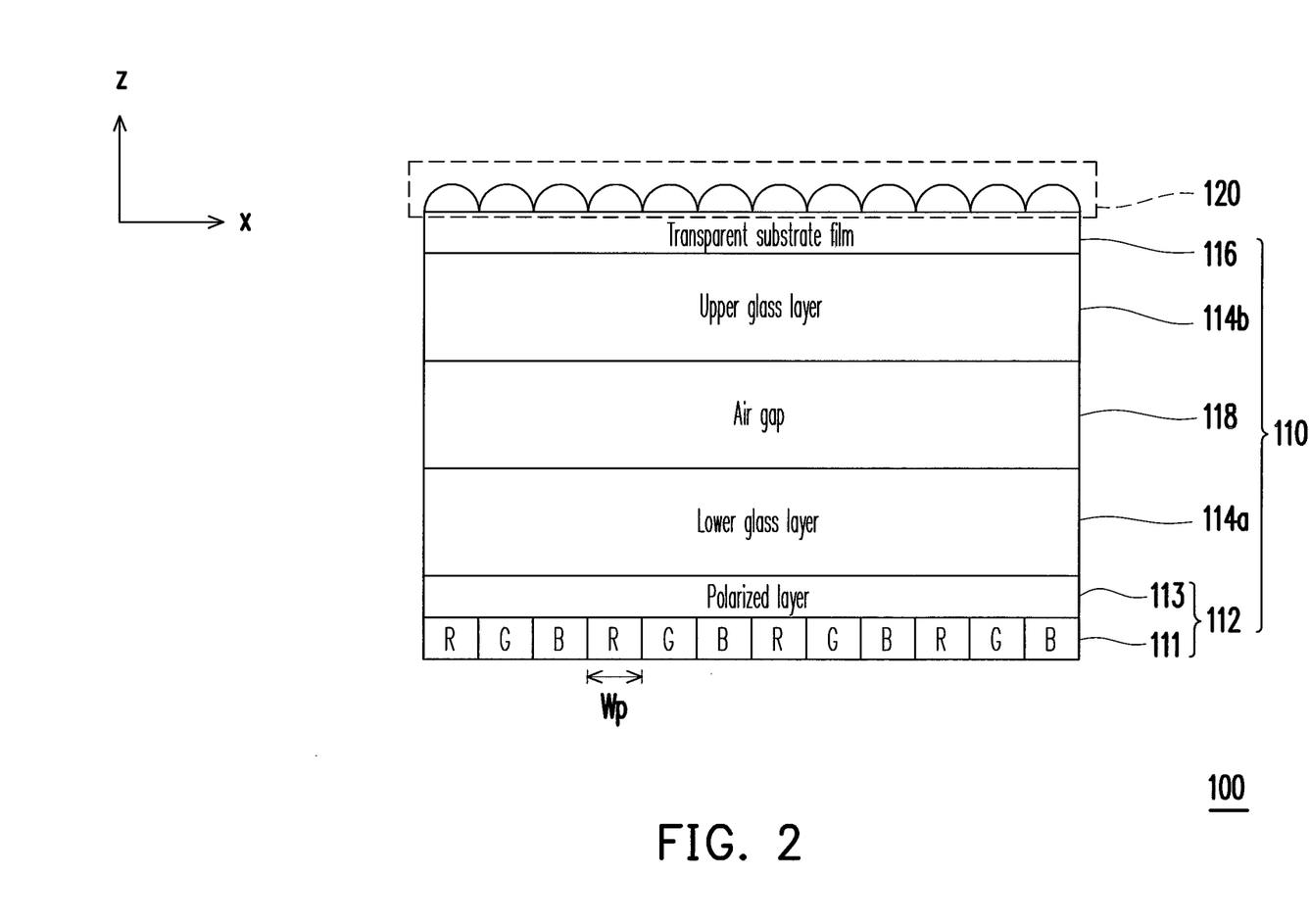
FIG. 2 is a schematic structural view of the stereo display apparatus in FIG. 1.

FIG. 2 is a schematic structural view of the stereo display apparatus in FIG. 1. Referring to FIG. 1 and FIG. 2, in the embodiment, the optical device 120 is disposed on the liquid crystal display panel 110 through a method of directly adhering or through a mechanical assembly method, and the optical device 120 has a periodic structure in at least one direction. The optical device 120 is, for example, a lenticular lens, but the invention is not limited thereto. In other embodiments, the optical device 120 is a liquid crystal lens, a barrier or a prism.

In the embodiment, the liquid crystal display 110 includes a base panel 112, a lower glass layer 114a, an upper glass layer 114b, and a transparent substrate film 116. The base panel 112 includes a polarized layer 113 and a color filter layer 111, and there is an air gap 118 between the lower glass layer 114a and the upper glass layer 114b.

In the embodiment, the material of the transparent substrate film 116 is, for example, polyethylene terephthalate (PET), but not limited thereto. The color filter layer 111 includes red (R), green (G), and blue (B) color sub-pixel units, to make a pixel plane and provide the image information for blending the stereo image. The width of each sub-pixel unit is Wp.

Using a 65 inch (65") public information display (PID) as an example, the sub-pixel units are 0.248 mm in width, 0.744 mm in height, and have a resolution of 1920×1080. Thus, in the embodiment, if the central view distance of the stereo display apparatus 100 is designed to be 3 meters, and the stereo display apparatus 100 has 8 preset view zones, then a curvature radius of each of the lenticular lens is, for example, 7 mm.

In the embodiment, the thickness and refractive index of each layer in the liquid crystal display 110 is shown in Table 1 as below:

TABLE 1

| | Thickness (mm) | Refractive index |
|---|---|---|
| Transparent substrate film 116 | 0.188 | 1.5 |
| Upper glass layer 114b | 4 | 1.5 |
| Air gap 118 | 4.6 | 1 |
| Lower glass layer 114a | 6 | 1.5 |
| Polarized layer 113 | 0.2 | 1.33 |
| Color filter layer 111 | 0.7 | 1.5 |

It should be noted that the width of each view zone in the embodiment must be calculated according to the corresponding display apparatus structure. No matter the structure of the display apparatus, the width W, view distance D, and width of the sub-pixel unit Wp satisfy with the following formula (1):

$$W/D=Wp/Dop \qquad \text{Formula (1)}$$

The optical distance Dop represents an optical path length of a beam when transmitted in the liquid crystal display panel 110. With the above formula (1), after the fabrication of the stereo display apparatus is completed, the width Wp of the sub-pixel units and the optical distance Dop is confirmed. Thus, in the image display method of the embodiment, when the distance D between the viewer and the stereo display apparatus 100 changes, the view zone width W will also change accordingly. In other words, the image display method of the embodiment is able to adjust the display content at different view distances, so as to increase the utilization convenience of the stereo display apparatus 100.

In detail, using the structure (65" PID) of the stereo display apparatus of the embodiment as an example, please refer to FIG. 1 and FIG. 2. Suppose the distance D between the viewer and the stereo display apparatus 100 is 2.5 meters, and 8 view zones are divided in the space. The effect from each layer structure of the liquid crystal display panel 110 to the optical distance Dop is determined according to the parameter of each layer shown in Table 1, and the calculated result is:

$$Dop = 0.188 \times 1.5 + 4 \times 1.5 + 4.6 \times 1 + 6 \times 1.5 + 0.2 \times 1.33 + 0.7 \times 1.5 = 12.01 \text{ mm}$$

Accordingly, substituting the values D=2.5 m, Dop=12.01 mm, and Wp=0.248 mm into formula (1) results in W=51.58 mm. That is to say, in the embodiment, when the view distance D changes, the view zone width W will also change accordingly.

Figure 3:
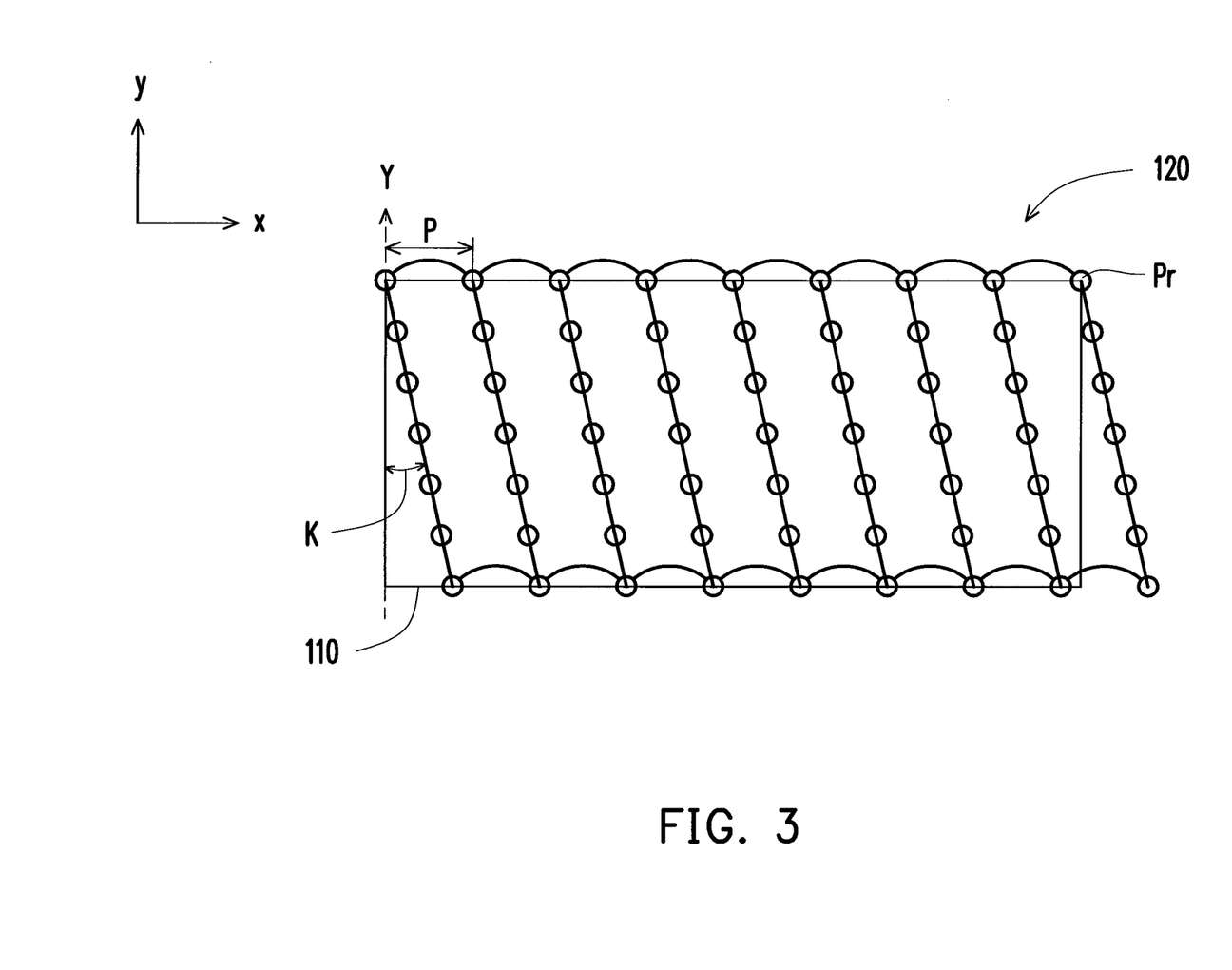
FIG. 3 is a schematic top view of the stereo display apparatus in FIG. 2.

FIG. 3 is a schematic top view of the stereo display apparatus in FIG. 2. Referring to FIG. 2 and FIG. 3, in the embodiment, the optical device 120 is, for example, formed through multiple lenticular lenses (i.e. T amount) arranged along x directions and having a period number of T, wherein after fabrication, a distance in between is p, and after attaching to the liquid crystal display panel 110, an angle between the y direction is k.

In the image display method of the embodiment, in order to maintain good display quality, a plurality of reference points Pr are defined on the lenticular lens (periodic structure) for follow-up calculations. In the embodiment, the reference points Pr are arranged in an array type along a first direction and a second direction, wherein the first direction is, for example, the x direction, and the second direction is, for example, a direction that has an angle K relative to the y direction. In addition, a distance P is in between each reference point Pr on the x direction of the embodiment.

Generally, if the lenticular lens is fabricated perfectly, and the angle to attach to the liquid crystal display panel is precise as generally designed, and the view distance of the viewer and the width of both eyes are the same as the intended value of the design of the lenticular lens, then P=p and K=k. However, with the current precision of fabrication and alignment, the above conditions are hard to achieve. In addition, the position of the viewer may also be different from the preset view distance, so the respective display content also needs to be adjusted.

Thus, in the image display method of the embodiment, the distance P is an adjustable parameter, used to adjust the display content of the x direction. The angle K is also an adjustable parameter, used to adjust the display content of the y direction. It should be noted that the adjustable angle K adjusts the angle between the second direction and the first direction.

When the position of the viewer is fixed (i.e. view distance D is fixed), a remote control or other input methods can be used to adjust the parameters P and K until the displayed stereo image is acceptable/satisfied. In other words, the display content can be adjusted by the parameters P and K according to the distance between the viewer and the stereo display apparatus. Thus, the parameters P and K obtained after the viewer adjustments can be regarded as a result from correction. When the stereo image is projected later, the stereo display apparatus 100 can image process the desired projected picture according to the parameters P and K.

Since the display content can be adjusted, the error tolerance of the alignment precision between the optical device and the display apparatus is greater, and thus lowering the difficulty in fabrication and the production cost.

Figure 4:
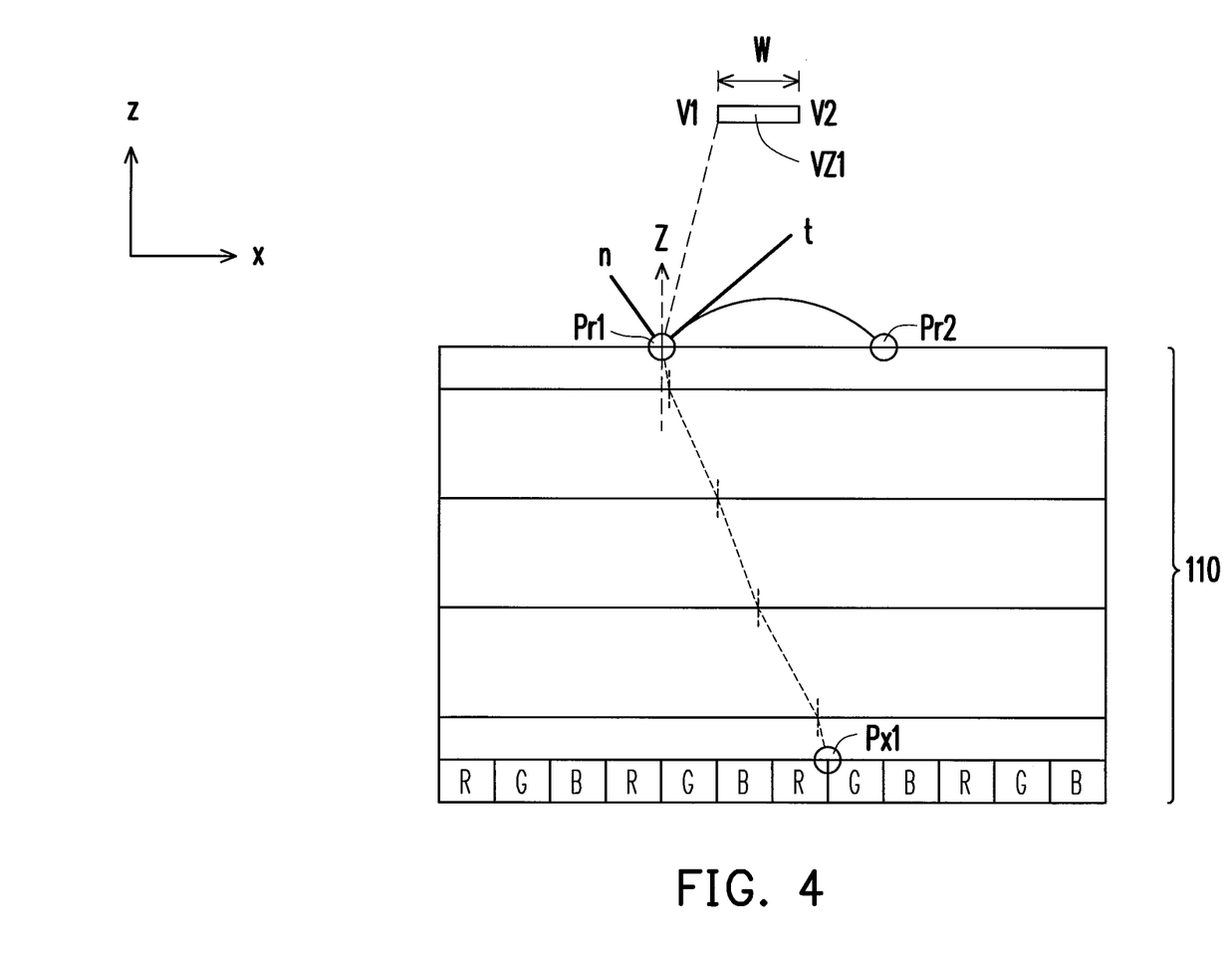
FIG. 4 is location information corresponding to a view zone of the pixel plane of FIG. 1.

FIG. 4 illustrates location information corresponding to a view zone of the pixel plane of FIG. 1. Referring to FIG. 1 and FIG. 4, in the embodiment, using two terminals V1 and V2 of the view zone VZ1 and reference points Pr1 and Pr2 as an example, ray tracing and Snell's law can be used to track which coordinate on the pixel plane corresponds to a light beam that passes through the reference point Pr1 and transmits to the terminal V1. In FIG. 4, t is the tangent line of the reference point Pr1 of the lenticular lens, and n is the normal line of the reference point Pr1 of the lenticular lens.

In detail, ray tracing and Snell's law can be used to calculate a coordinate of the terminal V1 with respect to the reference point Pr1 on the pixel plane as (Px1, Py1). Similarly, the above method can be used to calculate a coordinate of the terminal V1 with respect to the reference point Pr2 on the pixel plane as (Px2, Py2), and calculate coordinates of the terminal V2 with respect to Pr1 and Pr2 on the pixel plane as (Px3, Py3) and (Px4, Py4), respectively.

In other words, in the image display method of the embodiment, location information of the projection area corresponding to each view zone on the pixel plane is obtained according to each view zone and the corresponding reference points. Furthermore, the sub-pixel unit corresponding to each view zone is determined according to the location information of each projection area. In the embodiment, the projection area corresponding to each view zone on the pixel plane includes more than one sub-pixel unit.

From another standpoint, a specific sub-pixel unit may correspond to one view zone, and a weighting factor of the sub-pixel unit towards the specific image of the view zone is defined as 1. Thus, in the embodiment, the image display method further comprises comparing whether each sub-pixel unit corresponds to two or more view zones, to further calculate the weighting factor of the specific sub-pixel unit towards the specific image of the specific view zone. In the embodiment, 8 view zones are divided in the space, and 8 view zones represent 8 pictures of the same object at 8 different angles, so as to blend the stereo image of the object.

Figure 5A:
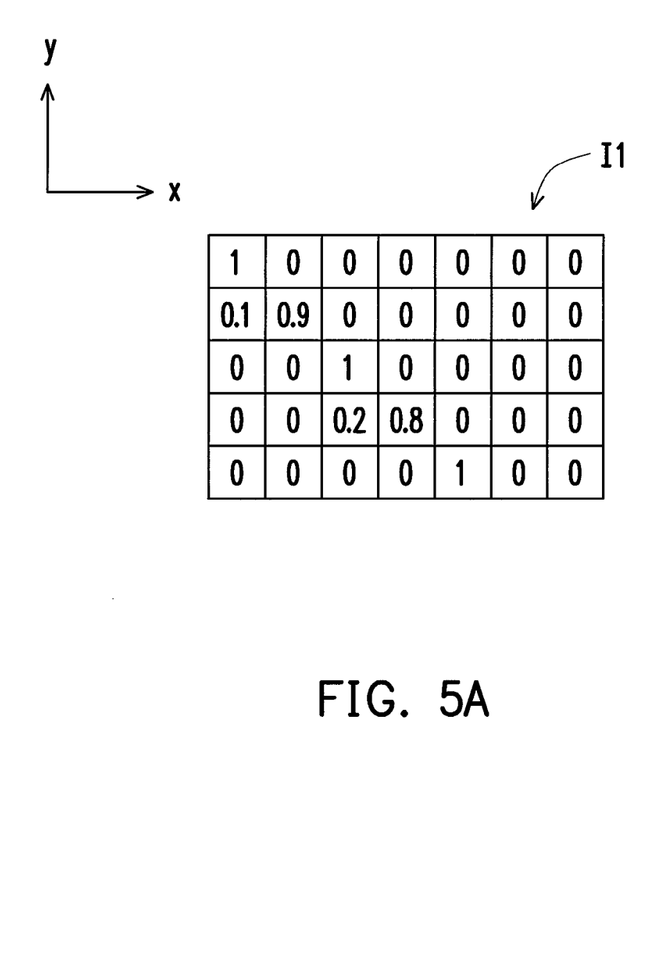
FIG. 5A and FIG. 5B are the occupied weighting factor of each sub-pixel unit at pictures with different angles before the stereo image is blended
Figure 5B:
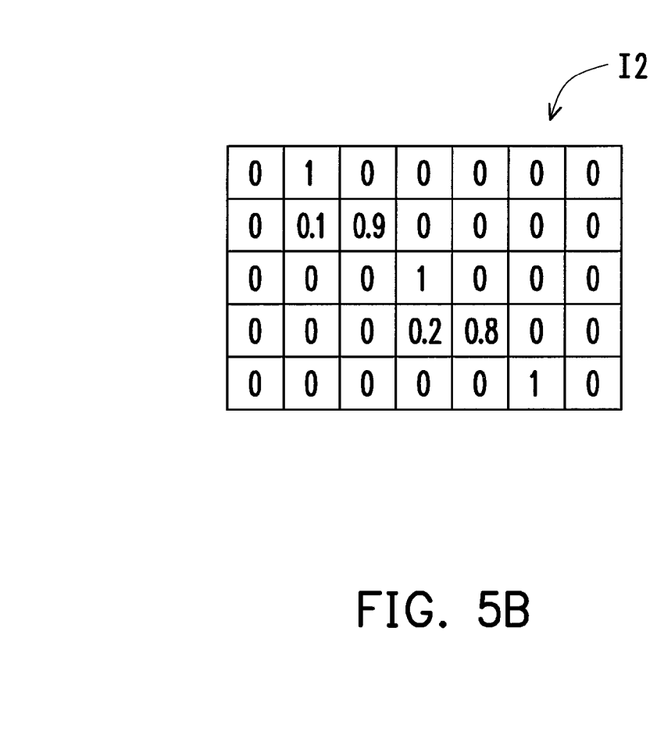

FIG. 5A and FIG. 5B show the occupied weighting factor of each sub-pixel unit at pictures with different angles before the stereo image is blended. Referring to FIG. 5A and FIG. 5B, in FIG. 5A and FIG. 5B, pictures I1 and I2 are respectively divided into a plurality of blocks. Each block corresponds to a plurality of sub-pixel units on the pixel plane. If each of the sub-pixel units does not correspond to two or more view zones, then the image information of each of the sub-pixel units is regarded as the image information of the corresponding view zone. For example, in FIG. 5A and FIG. 5B, blocks labeled as 1 mean that the sub-pixel units of the block correspond to only one specific view zone.

If each of the sub-pixel units corresponds to two or more view zones, then image information of each of the sub-pixel units is superposed according to a projection capacity of the projection area corresponding to each view zone, so as to obtain the image information of each view zone. For example, in FIG. 5A and FIG. 5B, blocks labeled as 0.1, 0.2, 0.8, and 0.9 mean that the sub-pixel units of the blocks correspond to two or more view zones, wherein the value shown in the block represents the corresponding weighting factor of the block. It should be noted that, in the embodiment, the weighting factor occupied by each sub-pixel unit corresponding to different images is, for example, proportional with the projection capacity (i.e. area of projection) of the projection area corresponding to each view zone, and also the weighting factor is the function of the projection capacity of the projection area. In other words, the superposing method of the image information of each of the sub-pixel units is the function of the projection capacity of the projection area corresponding to each view zone, so as to obtain the image information of each view zone.

It should be noted that FIG. 5A and FIG. 5B only show the weighting factor distribution of each sub-pixel unit in the pictures I1 and I2 for blending the stereo image. In the embodiment, blending a stereo image requires image information from 8 pictures.

Thus, in the image display method of the embodiment, by adjusting the parameters P and K, the weighting factor of each sub-pixel unit corresponding to each picture can be adjusted, so as to change the image information inputted to each sub-pixel unit, and thus achieving the goal of adjusting the image content according to the distance between the viewer and the stereo display apparatus.

Figure 6:
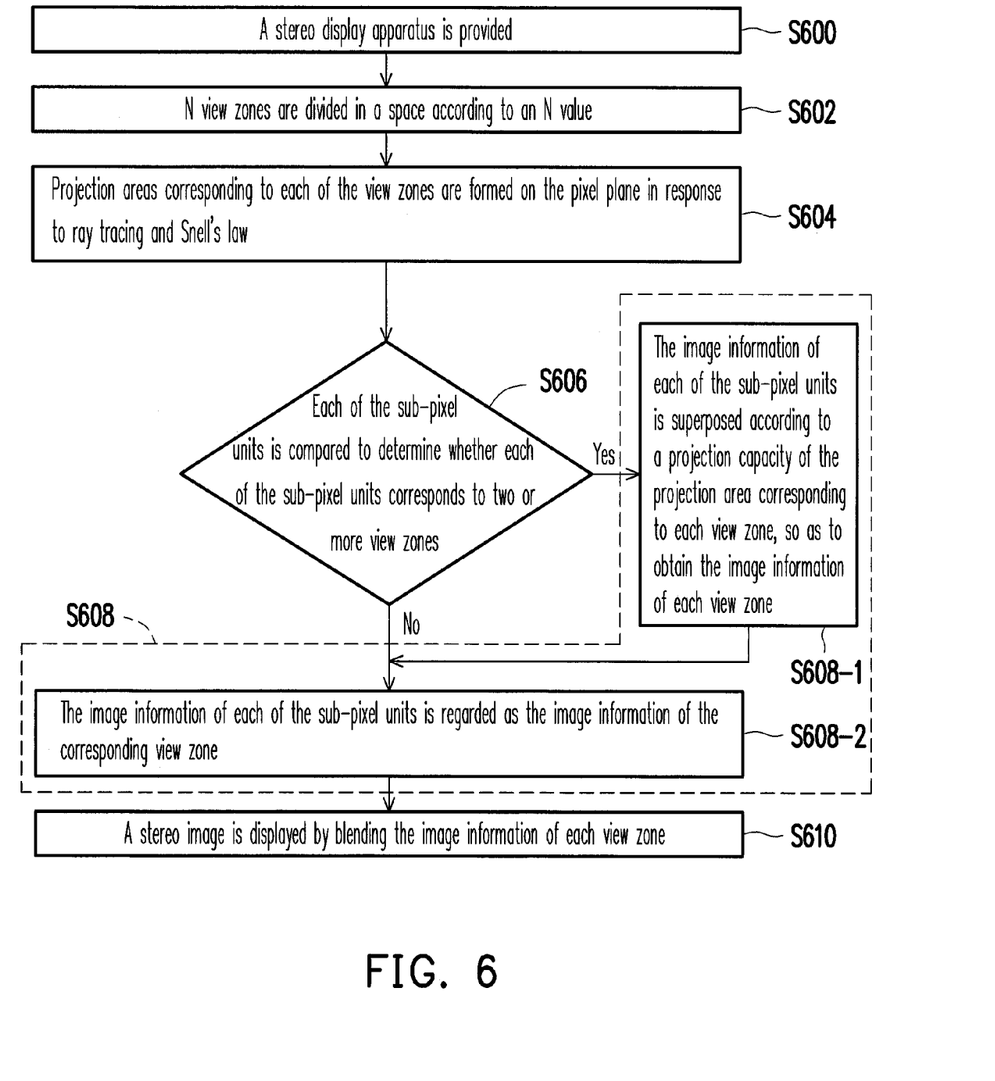
FIG. 6 is a flow chart illustrating an image display method according to an embodiment.
Figure 7:
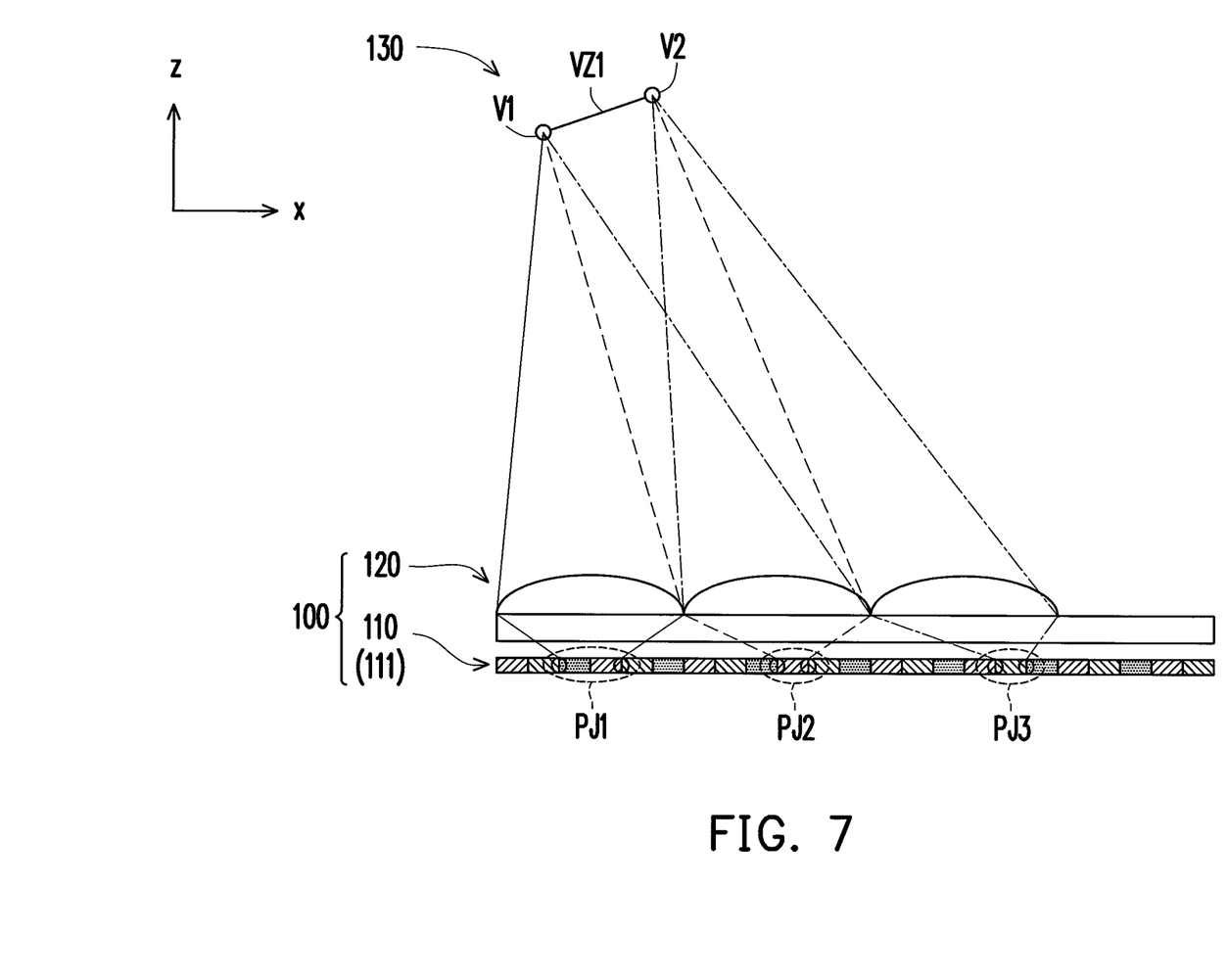
FIG. 7 is a schematic simplified view of the stereo display apparatus in FIG. 1.

FIG. 6 is a flow chart illustrating an image display method according to an embodiment. FIG. 7 is a schematic simplified view of the stereo display apparatus in FIG. 1. Referring to FIG. 6 and FIG. 7, in the embodiment, the period number of the lenticular lens 120 is T, and 8 view zones 130 are divided in a space. FIG. 7 only shows part of the lenticular lens and the view zones, to simplify the figure. The image display method of the embodiment includes the following steps.

First, in step S600, a stereo display apparatus 100 is provided.

Next, in step S602, N view zones are divided in a space according to an N value, wherein each view zone has image information corresponding to a picture. Since the period number of the lenticular lens is T, each view zone uniformly forms into T projection areas PJ1, PJ2, PJ3, ..., PJT (not shown) on the pixel plane 111.

Namely, in step S604, the projection areas corresponding to each of the view zones are formed on the pixel plane 111 in response to ray tracing and Snell's law by the lenticular lens 120. From the projection capacity (i.e. area covered by the projection area) of each view zone on the pixel plane 111, the quantity of the sub-pixel units corresponding to each view zone is known. Furthermore, the image information of each of the sub-pixel units regarded as the image information of the corresponding view zone is obtained according to the quantity (one or more) of the sub-pixel units in each corresponding view zone.

Then, in step S606, each of the sub-pixel units is compared to determine whether each of the sub-pixel units corresponds to two or more view zones, and thus, in step S608, image information of each view zone is obtained according to the corresponding sub-pixel units. To be specific, if each of the sub-pixel units corresponds to two or more view zones, then in step S608-1, the image information of each of the sub-pixel units is superposed according to a projection capacity of the projection area corresponding to each view zone, so as to obtain the image information of each view zone. For example, if a specific sub-pixel unit corresponds to the view zones VZ1 and VZ2, the projection capacity of the sub-pixel units of the view zones VZ1 and VZ2 are respectively Pj1 and Pj2, and the image information of the corresponding picture are respectively i1 and i2, then the image information of the sub-pixel units are f×i1+g×i2, wherein f and g are the functions of the projection capacity Pj1 and Pj2. In the other hands, if each of the sub-pixel units does not correspond to two or more view zones, then in step S608-2, the image information of each of the sub-pixel units is regarded as the image information of the corresponding view zone.

Finally, in step S610, a stereo image is displayed by blending the image information of each view zone.

In addition, the image display method of an embodiment can obtain enough teachings, advice, and descriptions through the illustrations of the embodiments of FIGS. 1~5, thus such details will not be illustrated herein again.

Figure 8A:
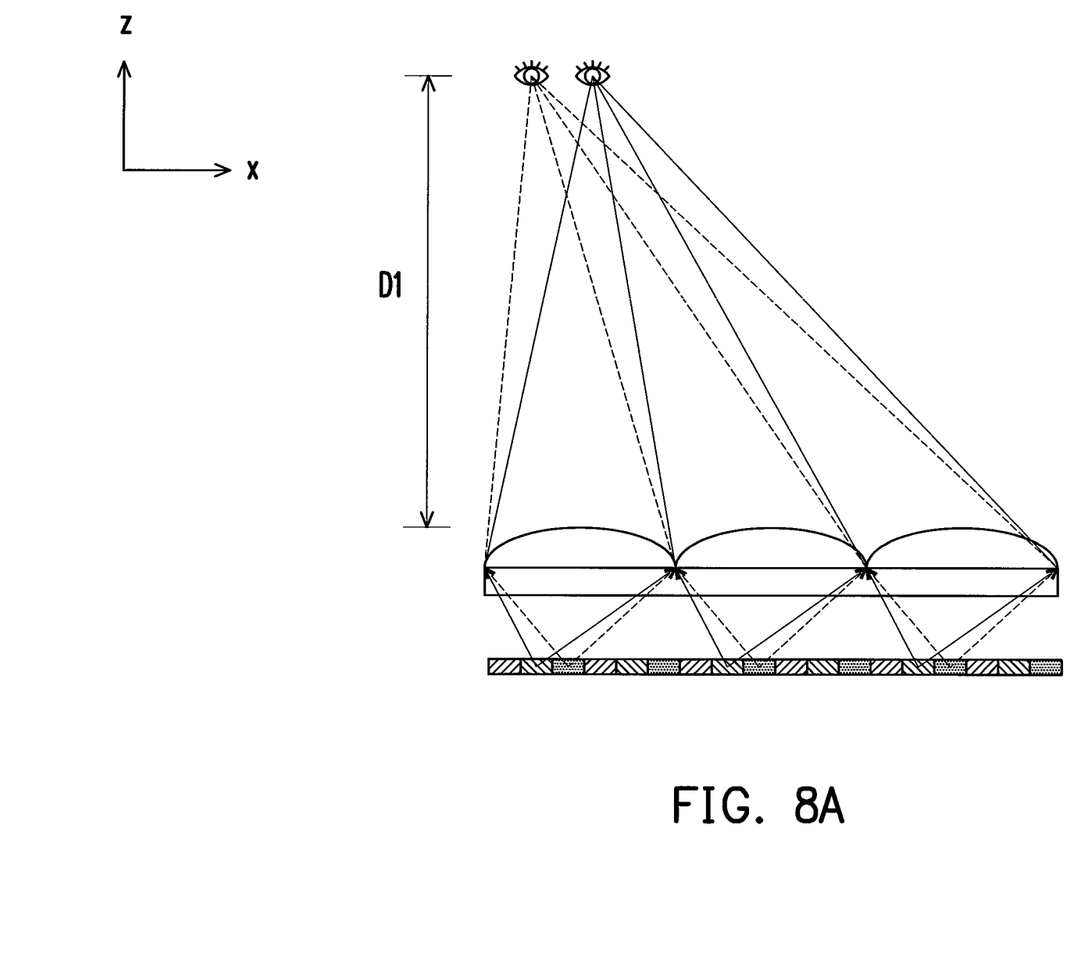
FIG. 8A and FIG. 8B are schematic views of different view distances according to an embodiment.
Figure 8B:
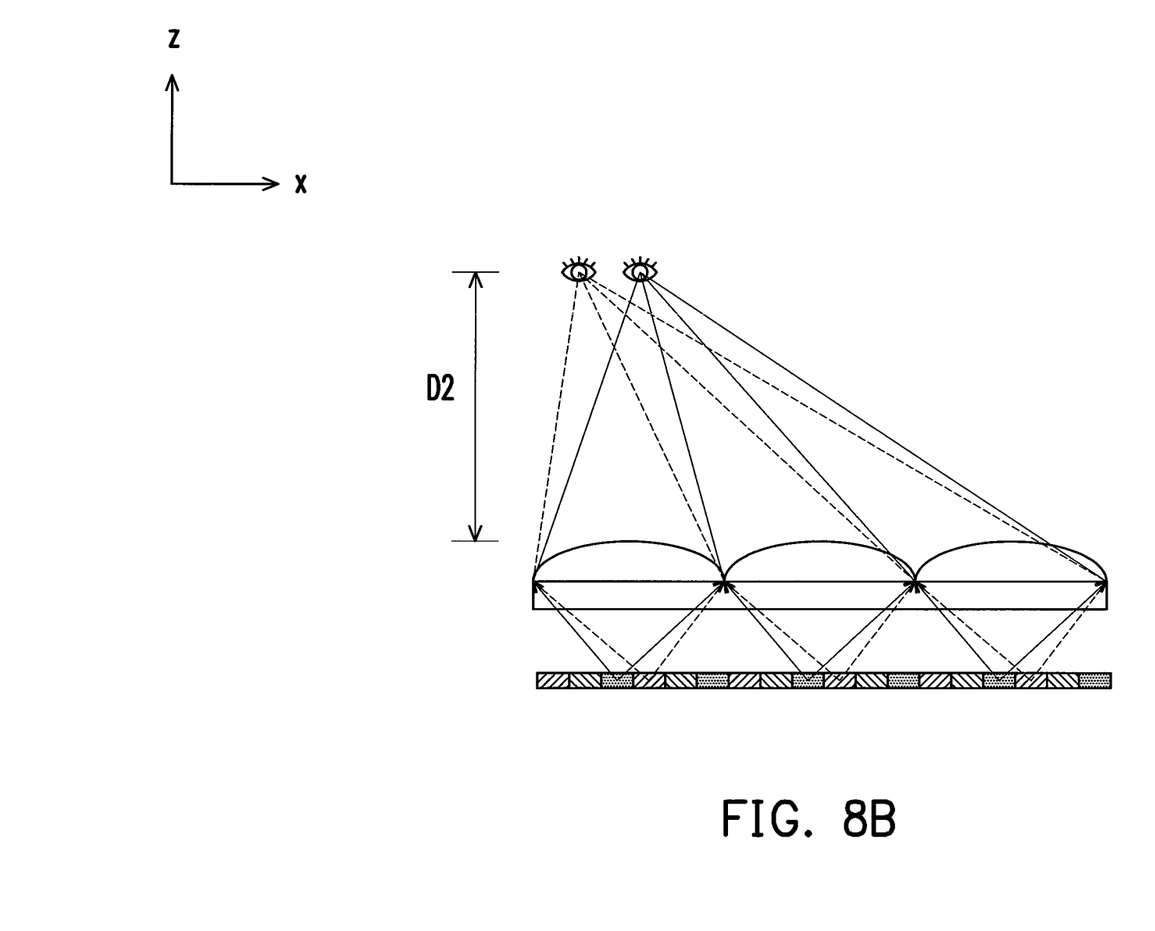

From another viewpoint, FIG. 8A and FIG. 8B are schematic views of different view distances according to an embodiment. Referring to FIG. 8A and FIG. 8B, in the embodiment, ray tracing and Snell's law are used to calculate the sub-pixel units corresponding to each view zone, so as to further determine the required image information each sub-pixel unit gives to the corresponding view zone.

When the viewer is at different positions (i.e. FIG. 8A or FIG. 8B), a remote control or other input methods can be used to adjust the parameters P and K until the displayed stereo image is acceptable. The parameters P and K are adjusted according to, for example, the viewers left eye and a check pattern, so as to proceed with image adjusting. Then, the viewer uses the right eye and a different check pattern to proceed with image adjusting, until the displayed stereo image is acceptable.

Generally, in the embodiment, the image display method of the stereo display apparatus can adjust display content directed to different view distances, so as to increase the utilization convenience and the error tolerance of the alignment precision between an optical device and a display apparatus.

It will be apparent to those skilled in the art that various modifications and variations can be made to the structure without departing from the scope or spirit. In view of the foregoing, it is intended that the invention cover modifications and variations of this invention provided they fall within the scope of the following claims and their equivalents.

What is claimed is:

1. An image display method for a stereo display apparatus, the image display method comprising:
    providing a stereo display apparatus, wherein the stereo display apparatus comprises a periodic structure and a pixel plane;
    dividing N view zones in a space;
    forming a plurality of projection areas corresponding to each of the view zones on the pixel plane by the periodic structure, wherein each of the projection areas corresponds to at least one sub-pixel unit on the pixel plane;
    obtaining an image information of each view zone according to the corresponding sub-pixel units;
    adjusting a display content of the pixel plane according to a distance between a viewer and the stereo display apparatus;
    comparing each of the sub-pixel units to determine whether each of the sub-pixel units corresponds to two or more view zones, and
    displaying a stereo image by blending the image information of each view zone,
    wherein if each of the sub-pixel units does not correspond to two or more view zones, in the step of obtaining image information of each view zone, the image information of each of the sub-pixel units is regarded as the image information of the corresponding view zone,
    wherein if each of the sub-pixel units corresponds to two or more view zones, in the step of obtaining image information of each view zone, the image information of each of the sub-pixel units is superposed according to a projection capacity of the projection area corresponding to each view zone, so as to obtain the image information of each view zone.

2. The image display method as claimed in claim 1, wherein each of the view zones is a one dimensional spatial line segment or a two dimensional spatial plane.

3. The image display method as claimed in claim 1, wherein a period number of the periodic structure is T, in the step of forming each projection area on the pixel plane, each view zone is formed into T projection areas on the pixel plane.

4. The image display method as claimed in claim 1, further comprising:
  defining a plurality of reference points on the periodic structure;
  obtaining location information of the projection area corresponding to each view zone on the pixel plane according to each view zone and the corresponding reference points; and
  determining the sub-pixel unit corresponding to each view zone according to the location information of each projection area.

5. The image display method as claimed in claim 4, wherein the plurality of reference points are arranged in an array type along a first direction and a second direction, the step of defining the plurality of reference points comprises:
  adjusting a distance between the reference points on the first direction according to a distance between the stereo display apparatus and a viewer; and
  adjusting an angle between the first direction and the second direction according to a distance between the stereo display apparatus and the viewer.

6. The image display method as claimed in claim 1, wherein the periodic structure comprises a lenticular lens, a liquid crystal lens, a barrier or a prism.

7. The image display method as claimed in claim 1, wherein the sub-pixel units comprise red sub-pixel units, green sub-pixel units, and blue sub-pixel units.

8. A stereo display apparatus, comprising a liquid crystal display panel and an optical device, characterized in that a display content of the liquid crystal display panel is adjusted according to a distance between a viewer and the stereo display apparatus,
  wherein the liquid crystal display panel comprises a pixel plane, and the optical device comprises a periodic structure,
  wherein the stereo display apparatus provides N view zones for the viewer,
  wherein a plurality of projection areas corresponding to each of the view zones on the pixel plane are formed by the periodic structure,
  wherein each of the projection areas corresponds to at least one sub-pixel unit on the pixel plane,
  wherein an image information of each view zone is obtained according to the corresponding sub-pixel units,
  wherein each of the sub-pixel units is compared to determine whether each of the sub-pixel units corresponds to two or more view zones,
  wherein a stereo image is displayed by blending the image information of each view zone,
  wherein if each of the sub-pixel units does not correspond to two or more view zones, in obtaining the image information of each view zone, the image information of each of the sub-pixel units is regarded as the image information of the corresponding view zone,
  wherein if each of the sub-pixel units corresponds to two or more view zones in obtaining the image information of each view zone, the image information of each of the sub-pixel units is superposed according to a projection capacity of the projection area corresponding to each view zone, so as to obtain the image information of each view zone.

9. The stereo display apparatus as claimed in claim 8,
  wherein the optical device is disposed on the liquid crystal display panel through a method of directly adhering or through a mechanical assembly method.

10. The stereo display apparatus as claimed in claim 8, wherein the periodic structure comprises a plurality of reference points arranged in an array type along a first direction and a second direction,
  wherein a distance between the reference points on the first direction and an angle between the first direction and the second direction are adjusted according to the distance between the viewer and the stereo display apparatus, so as to adjust the display content of the stereo display apparatus.

11. The stereo display apparatus as claimed in claim 8, wherein the periodic structure comprises a lenticular lens, a liquid crystal lens, a barrier or a prism.

12. The stereo display apparatus as claimed in claim 8, wherein the sub-pixel units comprise red sub-pixel units, green sub-pixel units, and blue sub-pixel units.

* * * * *